H. W. GRANN.
SPRAYING NOZZLE.
APPLICATION FILED JULY 18, 1913.
1,081,667.
Patented Dec. 16, 1913.
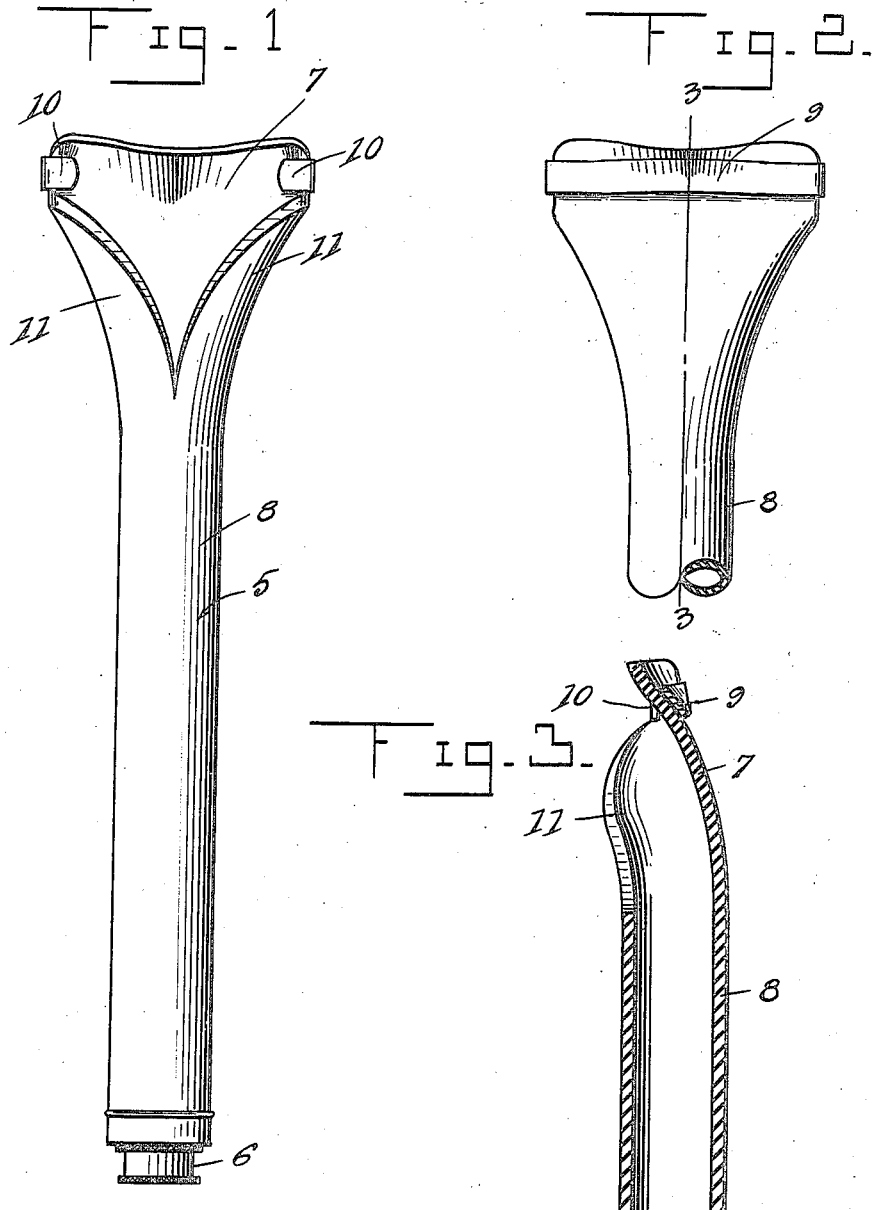

BEST AVAILABLE COPY

UNITED STATES PATENT OFFICE.

HENRY WILLIAM GRANN, OF BEDFORD HILLS, NEW YORK.

SPRAYING-NOZZLE.

1,081,667.

Specification of Letters Patent. Patented Dec. 16, 1913.

Application filed July 18, 1913. Serial No. 779,786.

*To all whom it may concern:*

Be it known that I, HENRY W. GRANN, a citizen of the United States, residing at Bedford Hills, in the county of Westchester and State of New York, have invented certain new and useful Improvements in Spraying-Nozzles; and I do hereby declare the following to be a full, clear, and exact description of the invention, such as will enable others skilled in the art to which it appertains to make and use the same.

This invention comprehends improvements in spraying nozzles and relates more particularly to those of the type which are especially adapted for use in connection with a watering hose.

One of the objects of the invention is to provide a spraying nozzle which will cause the water as it flows from the end thereof to spread into a thin sheet and wet a large area.

Another object of the invention is to provide a spraying nozzle of extremely simple construction, which may be very cheaply manufactured, and which may be quickly attached to the end of a watering hose.

The invention also aims to generally improve devices of this nature to render them more practical, useful, and commercially desirable.

With these and other objects in view, as will become more apparent as the description proceeds, the invention consists in certain novel features of construction, combination, and arrangement of parts, as will be hereinafter described and claimed.

For a complete understanding of my invention, reference is to be had to the following description and accompanying drawings, in which, Figure 1 is a top plan view of my improved nozzle, Fig. 2 is a fragmentary bottom plan view of the discharge end of the nozzle, and, Fig. 3 is a longitudinal sectional view taken on the plane of line 3—3 of Fig. 2.

My improved nozzle is preferably formed from a piece of flexible rubber tube, generally designated 5. One end of the tube is provided with a coupling member 6 so that the nozzle may be easily attached to a water hose or other supply member. The tube is slit longitudinally adjacent its other end and then straightened or spread to form a lip 7. This lip is curved, as shown in Fig. 3, so as to bring its free edge essentially in the plane of the top side of the unsplit portion or body 8 of the tube. To hold the lip in proper shape, I provide a transverse stiffening or bracing strip 9 which extends across the outer side of the lip near its free end and which has its end portions 10 clenched against the inner side of the lip and it will be noted that the cheek pieces 11 which were formed by longitudinally slitting the tube and bending it into the nozzle formation shown, diverge from the body 8 in regular curves and direct the water coming through the body preferably into contact with the lip 7.

When my nozzle is attached to a hose or other source of water supply it causes the stream of water flowing through the nozzle to spread and form a thin sheet, which will wet a large area. The curved lip 7 destroys the force of the stream of water so that there is no danger of flowers and other plants being injured.

From the foregoing description taken in connection with the accompanying drawings, it will be apparent that I have provided a very simple spraying nozzle which may be manufactured very cheaply and which when attached to a suitable source of water supply, will cause the water to be sprayed in a thin sheet.

It is to be understood that while I have shown and described the preferred embodiment of my invention, I do not wish to be limited to this exact construction, combination, and arrangement of parts, but may make such changes as will fall within the spirit and scope of the invention as claimed.

Having thus described my invention, I claim:—

A spraying nozzle formed from a piece of flexible tubing, said tubing being slit longitudinally adjacent one end and spread to form a lip extending across the discharge end of the unsplit portion of the tubing, diverging cheek pieces extending from the split end of the tube to the lip, and a reinforcing strip extending across the outer surface of the lip to hold the same in its spread position.

In testimony whereof I affix my signature in presence of two witnesses.

HENRY WILLIAM GRANN.

Witnesses:
TAZEWELL WIGGINS,
CHAS. S. PIERSALL.